Jan. 12, 1932.   O. H. PIEPER ET AL   1,840,636
UNITARY DENTAL APPARATUS
Filed April 17, 1928   7 Sheets-Sheet 1

Inventors:
Oscar H. Pieper
Alphonse F. Pieper
By Brown, Jackson, Boettcher & Dienner
Atty's

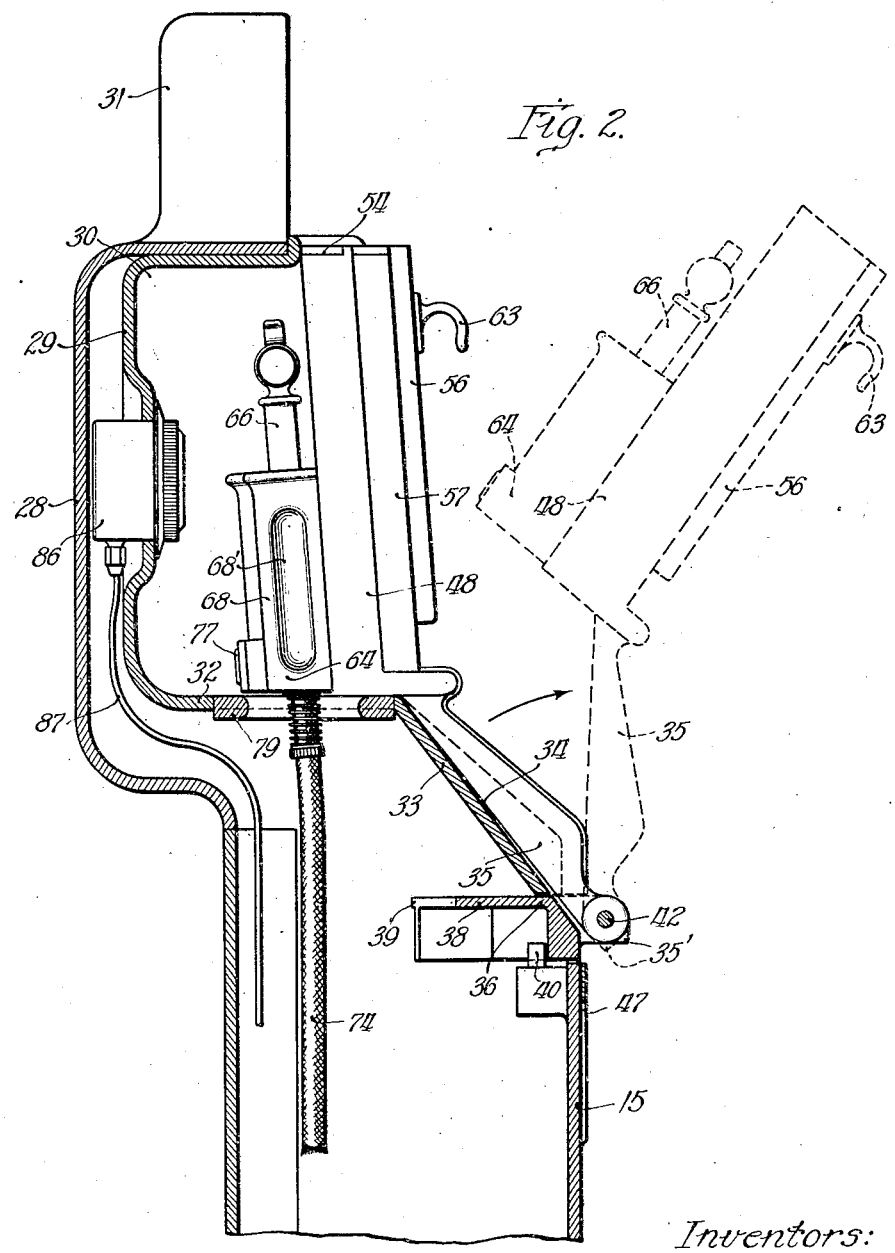

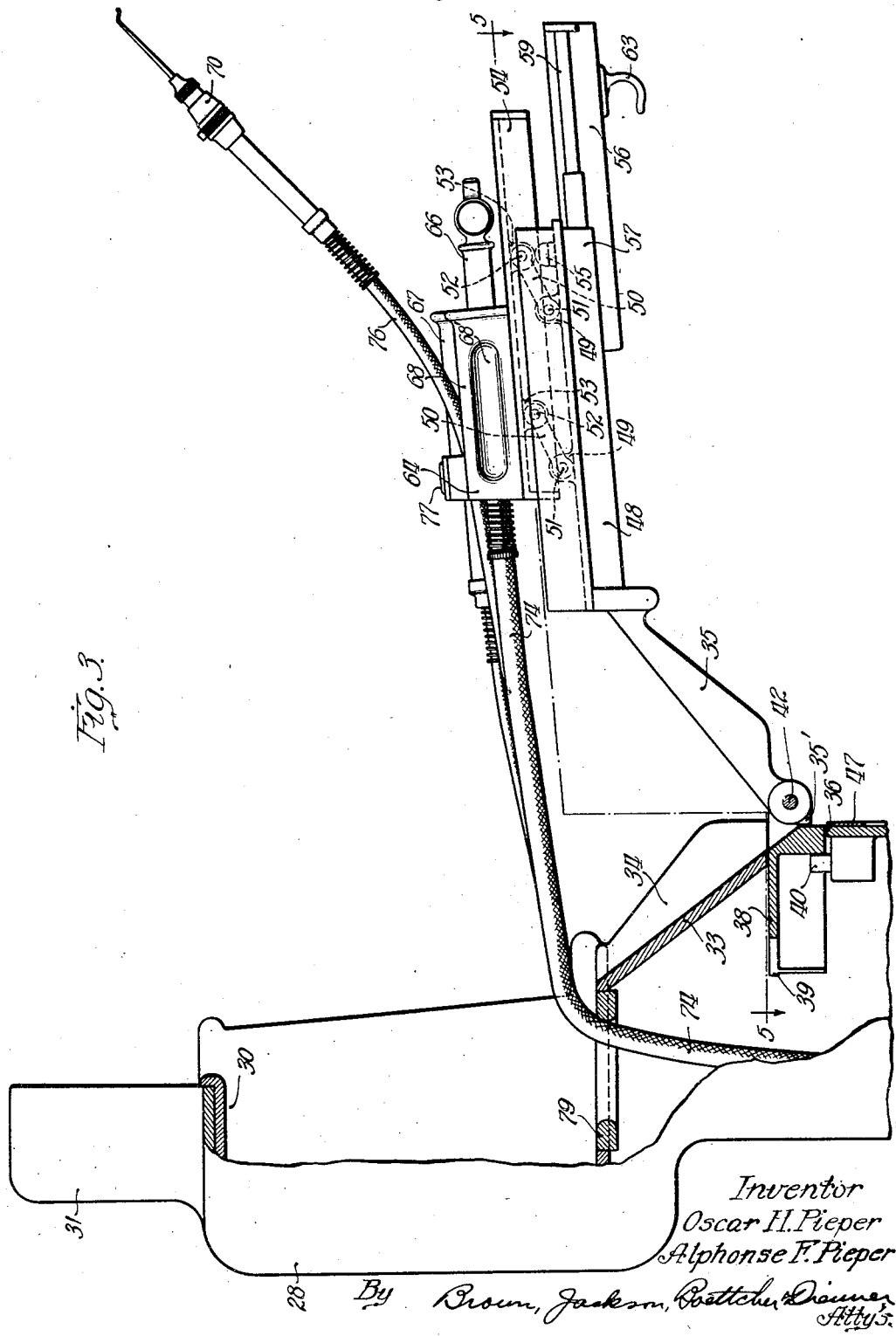

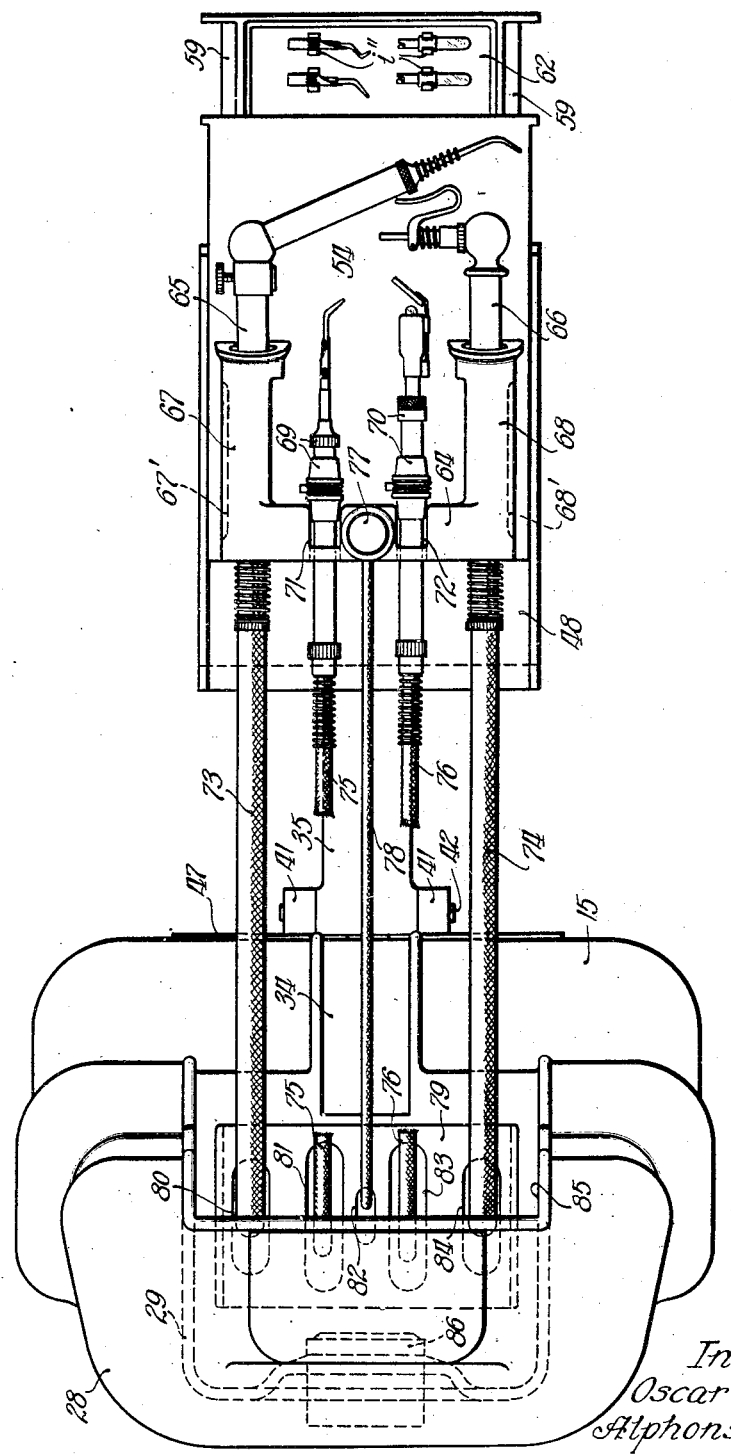

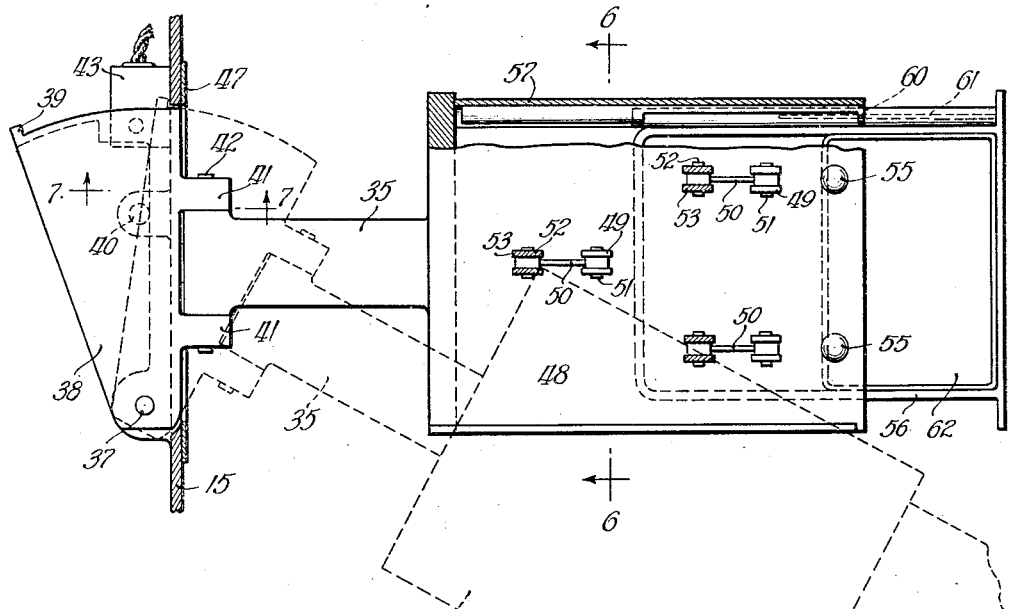
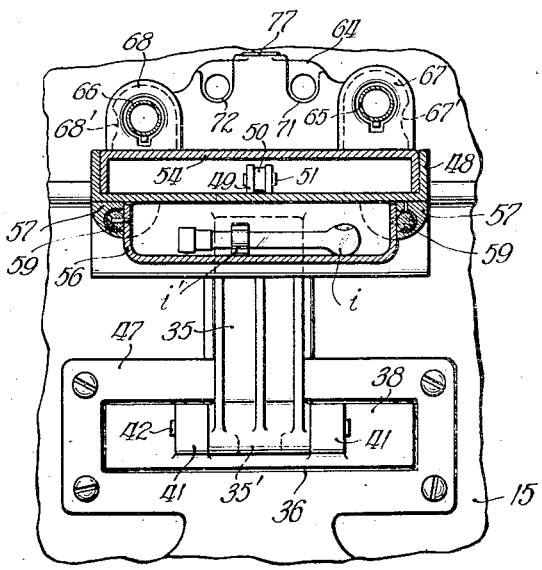
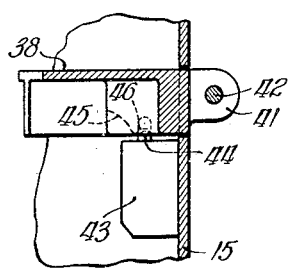

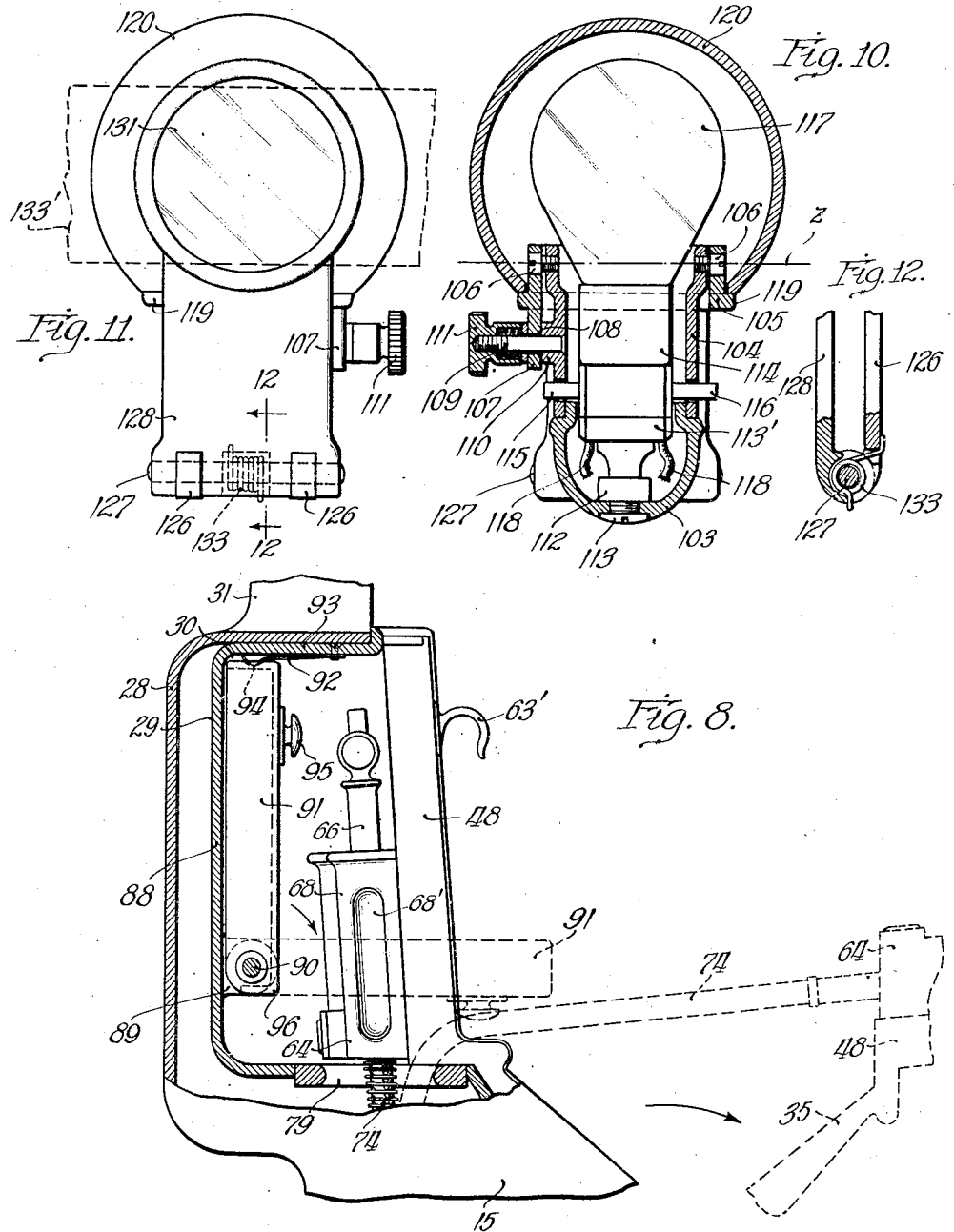

Patented Jan. 12, 1932

1,840,636

UNITED STATES PATENT OFFICE

OSCAR H. PIEPER AND ALPHONSE F. PIEPER, OF ROCHESTER, NEW YORK

UNITARY DENTAL APPARATUS

Application filed April 17, 1928. Serial No. 270,682.

Our invention relates to what has become known in the trade as dental units, or unit equipments, the purpose of which is to provide, in a unitary apparatus and within easy reach of the operator, the various electrical, compressed air, water and gas appliances used by the dentist in ordinary operations.

Such units ordinarily provide, in one structure, a dental engine, a fountain cuspidor, a bracket table, spray bottle warmers and various other appliances such as mouth instruments operated by air and electrical current. It also provides a switchboard whereby the electrically operated instruments may be connected in circuit and disconnected and suitably controlled.

The subject matter of the present invention is an improved structure particularly to the end of protection of the instruments and compactness of arrangement, when not in use, and greater accessibility and convenience, and greater service, when in use. Further subject matter of the invention lies in the embodiment of these features in a structure of simple and effective design.

In the accompanying drawings,

Figure 2 is a vertical sectional view of the upper portion thereof, showing it when the apparatus is not in use;

Figure 3 is a view similar to Figure 2, showing it in condition for use;

Figure 4 is a plan view of that part of the structure shown in Figure 3;

Figure 5 is a partial horizontal sectional view taken substantially on the plane of the line 5—5 of Figure 3, one of the parts, however, being in a different position, as will be described;

Figure 6 is a sectional view taken on the plane of the line 6—6 of Figure 5, looking in the direction indicated by the arrows;

Figure 7 is a detail sectional view taken on the plane of the line 7—7 of Figure 5, looking in the direction indicated by the arrows;

Figure 8 is a view similar to Figure 2, but showing a modification to which reference will be made;

Figure 10 is a sectional view taken on the plane of the line 10—10 of Figure 9 and looking in the direction indicated by the arrows;

Figure 11 is an end elevational view of the X-ray plate examination lamp;

Figure 12 is a detail sectional view, taken on the plane of the line 12—12 of Figure 11;

Figure 1:
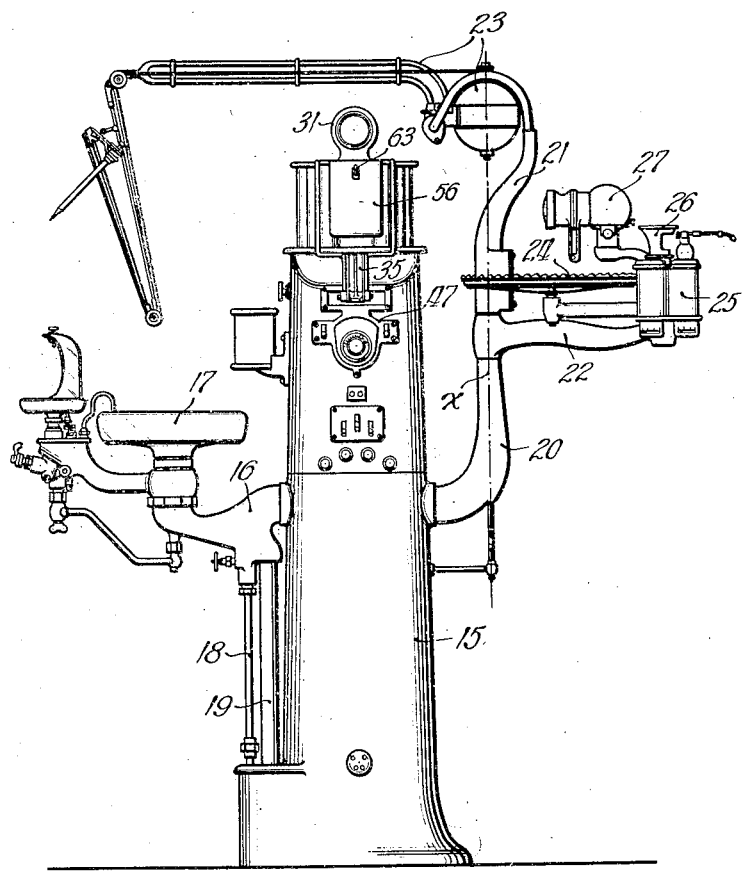
Figure 1 is a front elevational view of our improved unit.

The main supporting element of the apparatus is the hollow column 15 which is adapted to rest upon the floor, the various appliances carried thereby being thus disposed at appropriate height within convenient reach of the operator. Water and gas supply pipes, and electrical current supply conductors lead into the column 15, preferably through the bottom, suitable connections then being made with the various instruments and appliances which they serve.

On one side of the column 15, the supporting arm 16 is provided, and upon this supporting arm the fountain cuspidor 17 is arranged, suitable water supply and waste pipes 18 and 19, respectively, being provided to serve this portion of the apparatus.

On the opposite side of the column 15, the supporting arm 20 is provided, this supporting arm carrying two auxiliary arms 21 and 22, the former extending upwardly and the latter extending laterally and both of them being mounted upon the vertical axis indicated by the dot and dash line $x$.

The vertical arm 21 carries the dental engine 23 and the lateral arm 22 carries the bracket table 24, spray bottle warmers 25, Bunsen burner 26, and X-ray plate examination lamp 27.

The column 15 houses various mechanisms for the distribution and control of the operating agencies, but reference will be made only to those elements therein which have to do with the present invention.

The top of the column is offset rearwardly, as indicated at 28, to form an open front shell in which an open front housing 29, forming a compartment 30, is secured. A pilot lamp housing 31, preferably integral with the shell 28, is mounted upon the top thereof.

The front wall of the column 15 connects with the floor 32 of the housing 29, as best shown in Figures 2 and 3, by an oblique wall 33 in the middle of which a depression 34 is formed for the reception of a swinging arm 35 carrying an instrument support and tray which will be described presently.

The mounting of the arm 35 will now be described. At the junction of its front wall and the oblique wall 33, the column 15 is provided with a horizontal slot 36 at one end of which, inside the front wall, a pivot pin 37 is provided. Upon this pivot pin a bracket 38 is mounted for swinging movement, as indicated by the full and dotted lines in Figure 5. This movement is through the slot 36 and is limited outwardly by the projection 39 which engages with the inner face of the front wall and limited inwardly by engagement with a stop pin 40.

The front of the bracket 38 is provided with two lugs 41, 41, between which the end of the arm 35 is mounted to swing upon pivot pin 42. It will now be clear that the arm 35 swings upon the horizontal axis represented by the pin 42 which, in turn, swings about the vertical axis represented by the pin 37. It will appear, as this description proceeds, that, when the apparatus is to be used, the bracket 38 is swung to its outward position. It is appropriate, therefore, to let the movement of the bracket 38 operate the electrically controlled switch and, to this end, I have provided, on the inside of the front wall of the column, a switch 43, shown in Figures 5 and 7, operated by a plunger 44. This plunger is normally urged outwardly of the switch housing, and we arrange it for cooperation with a cam surface 45 and a catch depression 46 on the underside of the bracket 38 remote from the pivot 37.

When the plunger 44 is in its "up" position, as indicated in the dotted lines in Figure 7, the circuit controlled by the switch 43 is closed, and when it is in its "down" position, as indicated in full lines in Figure 7, the circuit controlled by the switch 43 is open. Consequently, when the bracket 38 is in its inner position, as indicated in full lines in Figure 5, the plunger 44 is held in its "down" position, with the circuit open, as is appropriate when the apparatus is out of use. The fact that the plunger 44 engages in the depression 46 enables it also to act as a lock for determining the inner position of the bracket 38 and so holding it. When the bracket is swung outwardly the plunger, riding up the cam surface 45, is permitted to rise, so as to close the circuit. The particular purpose of the cam surface 45 is to depress the plunger 44, upon the inward engaging movement of the bracket 38 and the fact that this operation will be as described is evident from Figure 7.

The opening 36 is conveniently surrounded by an escutcheon plate 47 which serves also, as will be evident from Figure 1, as a means of mounting the controls of electrical equipment within the column.

Upon its free end, the arm 35 carries the instrument support 48 which, as best shown in Figure 6, is of wide channel formation. In the upper side of the support 48, lugs 49, 49 are provided, and to these lugs swinging arms 50, 50 are pivoted at 51, 51.

The other ends of these arms are pivoted at 52, 52 to lugs 53, 53 provided in the underside of the auxiliary instrument support 54 which, as best shown in Figure 6, is of inverted wide channel formation. By this arrangement the auxiliary support 54 may occupy two positions relative to the main support 48, that shown in Figure 2, in which the former lies completely upon the latter, and that shown in Figures 3 and 4, in which the former is extended beyond the latter. The auxiliary support is moved from one position to the other simply by swinging it about the pivots 51, three pivotal points being provided, as indicated in Figure 5, in order to provide an appropriately firm connection. In its rearward position, the auxiliary support 54 sets down within the main support 48, as shown in Figure 6, and in its forward position it is raised somewhat, as shown in Figure 3, for a purpose to be described presently, by means of the engagement of the forward arms 50 with the rubber bumpers 55, 55.

The tray 56 is mounted on the underside of the main support 48, by means of cooperating guides 57, 57, at the sides of the latter, and slides 59, 59 fitting into the guides 57, 57 and secured to the sides of the former. This provides a sliding arrangement in the nature of a drawer for the storing of dental instruments of various kinds, as indicated at $i$, these instruments being held in place by spring clips $i'$. The sliding movement of the tray 56 relative to the support 48 is limited by the pin and groove arrangement 60, 61, shown in Figures 5 and 6. The removable tray 62 fits snugly within the forward portion of the tray 56, this removable tray being convenient for instruments which must be sterilized and which, preferably held by spring clips $i''$, can be taken collectively in the tray to the sterilizer.

The remainder of the tray 56 may be used for other purposes. The raised position of the auxiliary support 54, when swung forwardly, permits of ready access to the tray below. A finger piece 63 is provided on the underside of the tray 56 for the purpose of withdrawing the same from its closed position, completely under the support 48 to its outer position shown in Figure 3, and for a further purpose which will be referred to presently.

An instrument receptacle structure 64 is mounted on the top of the auxiliary support 54. This structure is for the reception of the handles or mountings for the devices which are supplied with compressed air or electrical current or both. The structure we have shown provides, for instance, for the reception of the hot air syringe, a so-called "air cut-off", a cautery, and a mouth lamp or other current consuming instrument. The hot air syringe shown at 65, and the air cut-off shown at 66 are lodged in tubular receptacles 67 and 68, respectively, while the cautery 69 and mouth lamp or other instrument 70 are lodged against suitable guide rings 71, 72, respectively. The receptacles 67 and 68 have the finger depressions 67' and 68' in their sides for the purposes of handling. Each of the four instruments is connected by a chord conductor with points of distribution for compressed air or electrical current, or both, within the column 15. The two outer instruments, that is, the hot air syringe and the air cut-off are connected with the compressed air source by means of the flexible tubes 73 and 74, respectively, the former tube having an electrical conductor extending therethrough to supply current, as well, to the instrument. The other two instruments have simply the electrical conductors 75, 76, respectively, leading therefrom to the appropriate points of distribution within the column 15.

A push button 77, for a call bell, is also conveniently provided upon the structure 64, the electrical conductor or conductors 78 therefrom leading into and through the column 15 as part of a call bell circuit.

The conductors 73, 74, 75, 76 and 78, whether they conduct air or electrical current, or both, are conveniently referred to as conductor chords, or chord circuits and each of them, as illustrated in Figures 2, 3 and 4, leads from the structure 64 directly into the open front housing 29 and downwardly through a suitable opening in the floor 32 thereof. This floor is provided with a rectangular opening in which an insert 79, of non-friction material, is disposed, this insert being provided with the openings 80, 81, 82, 83 and 84 for the chords 73, 75, 78, 76 and 74, respectively. The edges of these openings are suitably rounded as indicated in Figures 2 and 3 so that the chords which pass through may ride over them with a minimum of abrasion.

The chord circuits hang down into the column 15 with plenty of slack in order that they may lead out of the compartment 30 to the hand of the operator while in attendance upon a patient. They are automatically retracted into the column, as the operator permits, either by their own weight or by auxiliary means which may be provided. As a specific example, the chords may be arranged as shown in our Patent 1,376,356, dated April 27, 1921, which shows them looped downwardly from the distribution points and then upwardly out of the column, retracting weights, suitably guided to avoid interference being hung in the loops.

The arrangement may be such that the retracting strain on the chords is constant and no more than is comfortable for the operator or means may be provided to take the retracting strain from the hand of the operator, at his will, when the instrument is in use. In any event, it is sufficient for present purposes, to understand that the chords are arranged for retraction into the column.

The position of the main support 48 upon the arm 35 is such that when the arm 35 is thrown back into the depression 34, as indicated in Figure 2, the support 48 will lie over, and preferably close, the open front of the housing 29. It will be noted, from Figure 4, that the housing 29 is not as wide, from side to side as the shell 28 and that the shell is recessed at its front, commensurately with the housing, as indicated at 85. This enables the support 48, in its closing position, to lie within the recess 85 so that a graceful contour may be given the offset head, as a whole when in this closed condition. As before made clear, the auxiliary support 54 lies entirely within the main support 48, when thrown rearwardly (Figure 2), so that, with that and the closing of the drawer 56, the whole swinging assembly is collapsed into a compact arrangement, with the instruments in the compartment 30, over their respective openings in the insert 79, when thrown upwardly into the closing position. The finger piece 63 now will be seen to serve the purpose of a handle for manipulating the whole swinging assembly as well as for opening the drawer 56 when in its outward position.

Beginning with Figure 2, as showing the normal out-of-use condition of the apparatus, it will be clear that the operator, using the finger piece 63, brings down the whole swinging assembly, about the pivot 42, as indicated in dotted lines, until the stop 35' on the hub of the arm 35 engages the face of the bracket 38. The operator then swings the whole assembly in horizontal plane, about the pivot 37, as indicated in Figure 5, which action, as previously described, results in the closing of the operating circuit. The auxiliary support 54 may then be swung forwardly, into the position shown in Figures 3 and 4, the drawer 56 may be opened, and the apparatus is ready for use. Any one of the instruments 65, 66, 69 and 70 may be withdrawn, as indicated in Figure 3, and used by the operator, the operating agencies therefor being controlled from the front of the column. When the apparatus is to be restored to its out-of-use condition, the operator first moves the swinging assembly in horizontal plane to position at right angles to the face of the column, as indicated in full lines in Figure 5, thus breaking the operating circuit and bringing the assembly into position to be swung upwardly. He then throws back the auxiliary support 54 and closes the drawer 56 and, assuming that the four instruments are properly lodged in the receptacle structure 64, he then swings the whole upwardly and back into the position shown in Figure 2. The instruments thus are stowed out of the way and are well protected against dust and accidental contact.

One or more air gauges, for the air operated instruments, are provided in equipments of this kind and, since these gauges perform their function while the air operated instruments are in use, it is appropriate to locate them in such position that they are exposed only when the swinging assembly is brought down. Accordingly, we placed the air gauge 86 in the rear wall of the housing 29, as indicated in Figures 2 and 4, the dial projecting only slightly forwardly from the wall and the body of the device being located behind it, as shown. The tube connection 87 leads downwardly from the body of the gauge, back of the housing 29, and into the column 15 for connection there with the air line. More than one gauge 86 may, of course, be provided side by side. In Figure 8 we have illustrated a modification wherein the instrument drawer, instead of being provided upon the underside of the main support 48, is independently mounted within the housing analogous to the housing 29 previously described. This housing is indicated at 88, carrying, as will be seen, the forwardly extending lugs 89 upon which, by means of a pivot pin 90, the tray 91 is mounted. This tray, when out of use, is stowed up against the front of the rear wall of the housing 88, as shown in full lines, being held there by a lock spring 92 secured to the underside of the top wall 93 of the housing and engaging, at its end, with a depression 94 in the end of the tray. A finger piece 95 is provided for the purpose of manipulating the tray.

In this case the finger piece 63', otherwise analgous to the finger piece 63, is attached directly to the support 48. When the swinging assembly is brought down, as indicated in dotted lines, the tray 91 is then swung downwardly upon its pivot, into the position shown in dotted lines. Its horizontal position is determined by the stop portion 96 on what may be called the hub of the tray, this stop portion engaging with the front of the back wall of the housing.

We shall now describe the X-ray plate examination lamp shown particularly in Figures 9 to 14, inclusive.

At the free end of the arm 22 (Figure 1) a bracket 97 is mounted upon the axis $y$. This bracket has the laterally extending arm 98, which carries the spray bottle warmers 25, previously referred to, the lateral arm 99, which carries the bracket table 24, previously referred to, and the arm 100 which carries the X-ray plate examination lamp. The Bunsen burner tube 101 is conveniently arranged on the axis $y$, being supplied through suitable connections in the arms 22 and 20.

Figure 9:
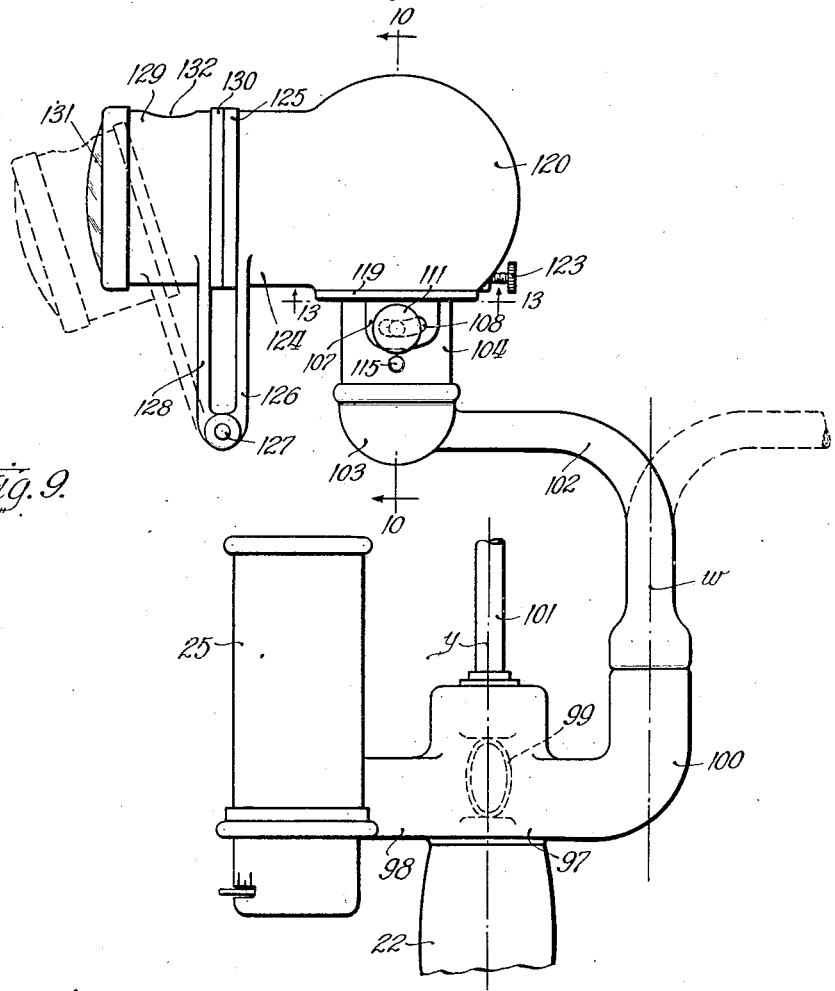
Figure 9 is a side elevational view of the X-ray plate examination lamp which we provide as a further feature.

Mounted upon the arm 100, to swing upon the axis $w$, is a supplemental bracket 102 which terminates in the supporting cup 103, best shown in Figure 10. Upon the rim of this cup a sleeve 104 is disposed, this sleeve having the shoulder ring 105 hung upon its upper end by means of the screws 106, 106 on the axis $z$. An ear 107 extends downwardly from the ring 105, as best shown in Figures 9 and 10, this ear having an arc-shaped slot 108 therein through which the screw stud 109, lodged in a boss 110 on the sleeve 104, extends.

Figure 14:
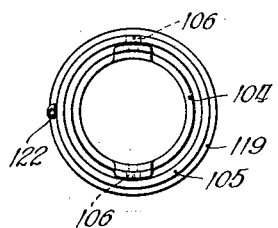

The slot 108 is shaped about the axis $z$ as a center, the purpose of this arrangement being to permit the swinging of the ring 105, on the sleeve 104, about the axis $z$ in the limited range defined by the slot 108. The thumb screw 111 engaging the screw stud 109, is provided for the purpose of securing the ring 105 in any adjusted position. Figure 14 shows the arrangement between the sleeve 104 and ring 105, looking downwardly thereon.

In the bottom of the supporting cup 103 a small pillar 112 is secured by means of a screw 113 and upon this pillar a switch socket is mounted, the switch portion being shown at 113' and the socket portion at 114. The operating members 115, 116 for the switch extend, as shown, through suitable openings in the sleeve 104 for manipulation by the operator. An incandescent lamp 117 is inserted in the socket 114. The supply conductors for this socket switch are shown at 118, these conductors being led down through the supplementary bracket 102, the arm 100, bracket 97, and arms 22 and 20, into the column 15 where they are suitably connected in circuit.

Figure 13:
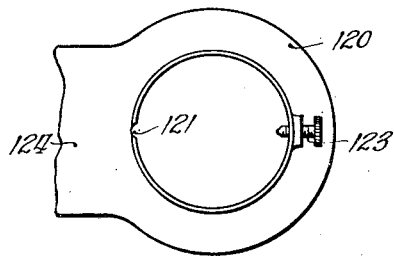
Figures 13 and 14 are further detail views of the X-ray plate examination lamp.

Surrounding the lamp 117 and resting upon shoulder 119 on the ring 105, is the generally spherical lamp housing 120, the underside of which is shown in Figure 13. This housing is held in place upon the ring 105 by slipping the notch 121, on the inside of the circular opening at the bottom thereof over the screw head 122 on the ring 105, and then tightening the set screw 123, carried by the housing, against the ring 105.

The front of the housing 120 is formed into an open tubular portion 124 having the rim 125. A bracket 126 extends downwardly from housing 120, at the front of the portion 124, and carries, at its lower end, a pivot pin 127 upon which an arm 128, carrying a lens cap, is mounted. This lens cap is shown at 129 and, when the arm 128 is in vertical position, lies in axial alignment with the portion 124 of the housing 120. The cap 129 has the rim 130, for cooperation with the rim 125, at its rear end and has the lens 131 at its forward end. An access opening is provided at 132. A coiled spring 133, mounted upon the pivot pin 127 has its ends engaging with the arms 126 and 128, respectively, this spring operating to urge the cap 129 against the housing 120. The X-ray plate or film, indicated at 133' in Figure 11, is placed, by the operator, between the rims 125 and 130, the cap 129 being drawn forwardly to permit of this insertion of the plate or film. The lamp is then lighted and the operator, looking through the lens 131, may examine the plate or film with convenience and under conditions to permit careful scrutiny of detail. In view of the swinging movement of the arm 22 upon the arm 20, the pivotal mounting of the bracket 97 relative to the arm 22, the pivotal mounting of the bracket 102 relative to the arm 100, and the pivotal mounting of the housing 120 relative to the bracket 102, permits of bringing the X-ray plate examination lamp into any position desired by the operator for the purpose of this examination.

We claim:

1. In a dental unit, a main supporting member having a housing forming a compartment mounted thereon, a bracket mounted on said supporting member and swinging upon a vertical axis, an arm mounted thereon and swinging upon a horizontal axis, and a cover for said compartment carried upon said arm.

2. In a dental unit, a main supporting member having a housing forming a compartment mounted thereon, a bracket swinging upon a vertical axis relative to said supporting member and housing, an arm swinging upon a horizontal axis relative to said bracket, a cover for said compartment carried upon said arm and instruments mounted upon said cover and adapted to enter said compartment.

3. In a dental unit, a main supporting member having a housing forming a compartment mounted thereon, a bracket swinging upon a vertical axis relative to said supporting member and housing, an arm swinging upon a horizontal axis relative to said bracket, a cover for said compartment carried upon said arm, instruments mounted upon said cover and adapted to enter said compartment, and cord circuits leading from said cover through said compartment and into said main supporting member.

4. In a dental unit, a supporting column having a slot in the front wall thereof, a bracket mounted upon a vertical axis in said column and adapted to swing outwardly through said slot, an instrument carrier mounted upon a horizontal axis upon said bracket, and instruments mounted upon said carrier.

5. In a dental unit, a supporting member, a bracket mounted to swing on said member from an out-of-use position to and in-use position, electrical instruments carried by said bracket, an electric switch carried by said supporting member and having an actuating member operated by said bracket to be closed when said bracket is in in-use position and opened when said bracket is in out-of-use position, said actuating member being a spring-pressed plunger adapted to cooperate with a depression in said bracket to form a yielding lock for positioning said bracket.

6. In a dental unit, a supporting member, a bracket mounted to swing on said member from an out-of-use position to an in-use position, electrical instruments carried by said bracket, an electric switch carried by said supporting member and having an actuating member operated by said bracket to be closed when said bracket is in in-use position and opened when said bracket is in out-of-use position, said actuating member being a spring-pressed plunger adapted to cooperate with a depression in said bracket to form a yielding lock, and said bracket having a cam-surface to engage said plunger when moved to out-of-use position.

7. In a dental unit, a housing forming a compartment, a movable cover for said compartment, an instrument support mounted upon said cover and adapted to occupy two positions relative to said cover, one of them within the dimensions of the cover and the other extending beyond the same and forwardly therefrom, and instruments carried by said support and adapted to enter said compartment when said support is in said first-named position and said cover is in closed position.

8. In a dental unit, a housing forming a compartment, a movable cover for said compartment, an instrument tray carried on one side of said cover, and instruments carried upon the other side of said cover.

9. In a dental unit, a housing forming a compartment, a movable cover for said compartment, a tray mounted upon the outside of said cover, and a finger piece for said tray.

10. In a dental unit, a housing forming a compartment, a movable cover for said compartment, a tray sliding upon the outside of said cover, and a finger piece for said tray whereby said cover may be moved to open position and said tray slid open.

In witness whereof, we hereunto subscribe our names this 14th day of April, 1928.

OSCAR H. PIEPER.
ALPHONSE F. PIEPER.